US008754173B2

(12) United States Patent
Loos et al.

(10) Patent No.: US 8,754,173 B2
(45) Date of Patent: Jun. 17, 2014

(54) METHOD FOR CONTINUOUSLY PRODUCING POLYESTER MIXTURES

(75) Inventors: Robert Loos, Mannheim (DE); Uwe Witt, Mutterstadt (DE); Motonori Yamamoto, Mannheim (DE); Günther Mair, Mannheim (DE); Andreas Garbe, Ludwigshafen (DE)

(73) Assignee: BASF SE (DE)

( * ) Notice: Subject to any disclaimer, the term of this patent is extended or adjusted under 35 U.S.C. 154(b) by 65 days.

(21) Appl. No.: 13/501,978

(22) PCT Filed: Oct. 12, 2010

(86) PCT No.: PCT/EP2010/065233
§ 371 (c)(1),
(2), (4) Date: Apr. 13, 2012

(87) PCT Pub. No.: WO2011/045293
PCT Pub. Date: Apr. 21, 2011

(65) Prior Publication Data
US 2012/0202928 A1    Aug. 9, 2012

(30) Foreign Application Priority Data
Oct. 15, 2009    (EP) .................................... 09173193

(51) Int. Cl.
*C08G 63/91*    (2006.01)
(52) U.S. Cl.
USPC ............ 525/411; 525/410; 525/415; 525/450; 525/437; 528/272; 528/298; 528/296; 528/302; 528/307; 528/308; 528/308.6
(58) Field of Classification Search
USPC ......... 525/410, 411, 415, 450, 418, 419, 437; 528/272, 298, 296, 302, 307, 308, 528/308.6
See application file for complete search history.

(56) References Cited

U.S. PATENT DOCUMENTS

| 6,297,347 | B1 * | 10/2001 | Warzelhan et al. ........... 528/272 |
| 6,812,321 | B1 | 11/2004 | Heitz et al. |
| 7,115,701 | B2 * | 10/2006 | Schultz Van Endert et al. ............... 528/271 |
| 2005/0163679 | A1 | 7/2005 | Schulz Van Endert et al. |
| 2011/0034662 | A1 | 2/2011 | Witt et al. |
| 2011/0039999 | A1 | 2/2011 | Witt et al. |
| 2012/0016090 | A1 | 1/2012 | Loos et al. |
| 2012/0202928 | A1 | 8/2012 | Loos et al. |

FOREIGN PATENT DOCUMENTS

| DE | 19929790 | 1/2001 |
| DE | 102005053068 | 5/2007 |
| WO | WO-03042278 | 5/2003 |
| WO | WO-2009/127555 | 10/2009 |
| WO | WO-2009/127556 | 10/2009 |
| WO | WO-2010/012695 | 2/2010 |
| WO | WO-2011/045293 | 4/2011 |
| WO | WO-2012/019868 | 4/2012 |

OTHER PUBLICATIONS

International Search Report for PCT/EP2010/065233 mailed Jan. 27, 2011.
Translation of the International Preliminary Report on Patentability for PCTEP/2010/065233 dated May 8, 2012.

* cited by examiner

*Primary Examiner* — Robert Jones, Jr.
(74) *Attorney, Agent, or Firm* — Drinker Biddle & Reath LLP

(57) ABSTRACT

The present invention relates to a process for the continuous production of polymer mixtures comprising:
a) from 10 to 80% by weight of a biodegradable polyester (Q) composed of aliphatic or aliphatic and aromatic dicarboxylic acids and of aliphatic dihydroxy compounds, and
b) from 20 to 90% by weight of one or more polymers (T) selected from the group consisting of: polylactic acid, polycaprolactone, polypropylene carbonate, polyglycolide, aliphatic polyester, cellulose acetate, and polyhydroxyalkanoate,
where
i) a mixture composed of the aliphatic dihydroxy compounds, of the aliphatic and aromatic dicarboxylic acids and, if appropriate, of further comonomers (component C) is mixed, without addition of any catalyst, to give a paste or, as an alternative, the liquid esters of the dicarboxylic acids are fed into the system, as also are the dihydroxy compound and, if appropriate, further comonomers, without addition of any catalyst, and in a first stage this mixture, together with the entire amount or with a portion of the catalyst, is continuously esterified or transesterified;
ii) in a second stage, the transesterification or, respectively, esterification product obtained in i) is continuously precondensed to an intrinsic viscosity of from 20 to 70 cm$^3$/g to DIN 53728;
iii) in a third stage, the product obtainable from ii) is continuously polycondensed as far as an intrinsic viscosity of from 60 to 170 cm$^3$/g to DIN 53728, and
iv) in a fourth stage, the product obtainable from iii) (polyester Q) is continuously mixed with the polymer T, and
v) if appropriate, in a fifth stage, the polymer mixture obtainable from iv) is continuously reacted in a polyaddition reaction with a chain extender D as far as an intrinsic viscosity of from 150 to 320 cm$^3$/g to DIN 53728.

17 Claims, No Drawings

METHOD FOR CONTINUOUSLY PRODUCING POLYESTER MIXTURES

CROSS-REFERENCE TO RELATED APPLICATIONS

This application is a national stage application (under 35 U.S.C. §371) of PCT/EP2010/065233, filed Oct. 12, 2010, which claims benefit of European Application No. 09173193.5, filed Oct. 15, 2009.

The present invention relates to a process for the continuous production of polyester mixtures comprising:

a) from 10 to 80% by weight of a biodegradable polyester (Q) composed of aliphatic or aliphatic and aromatic dicarboxylic acids and of aliphatic dihydroxy compounds, and b) from 20 to 90% by weight of one or more polymers (T) selected from the group consisting of: polylactic acid, polycaprolactone, polypropylene carbonate, polyglycolide, aliphatic polyester, cellulose acetate, and polyhydroxyalkanoate, where i) a mixture composed of the aliphatic dihydroxy compounds, of the aliphatic and aromatic dicarboxylic acids and, if appropriate, of further comonomers (component C) is mixed, without addition of any catalyst, to give a paste or, as an alternative, the liquid esters of the dicarboxylic acids are fed into the system, as also are the dihydroxy compound and, if appropriate, further comonomers, without addition of any catalyst, and in a first stage this mixture, together with the entire amount or with a portion of the catalyst, is continuously esterified or transesterified;

ii) in a second stage, the transesterification or, respectively, esterification product obtained in i) is continuously precondensed to an intrinsic viscosity of from 20 to 70 $cm^3/g$ to DIN 53728;

iii) in a third stage, the product obtainable from ii) is continuously polycondensed as far as an intrinsic viscosity of from 60 to 170 $cm^3/g$ to DIN 53728, and iv) in a fourth stage, the product obtainable from iii) (polyester Q) is continuously mixed with the polymer T, and v) if appropriate, in a fifth stage, the polymer mixture obtainable from iv) is continuously reacted in a polyaddition reaction with a chain extender D as far as an intrinsic viscosity of from 150 to 320 $cm^3/g$ to DIN 53728.

The invention in particular relates to a process for the continuous production of polymer mixtures comprising:

a) from 40 to 75% by weight of a biodegradable polyester (Q) composed of aliphatic or aliphatic and aromatic dicarboxylic acids and of aliphatic dihydroxy compounds, and b) from 25 to 60% by weight of polylactic acid, where i) a mixture composed of the aliphatic dihydroxy compounds, of the aliphatic and aromatic dicarboxylic acids and, if appropriate, of further comonomers (component C) is mixed, without addition of any catalyst, to give a paste or, as an alternative, the liquid esters of the dicarboxylic acids are fed into the system, as also are the dihydroxy compound and, if appropriate, further comonomers, without addition of any catalyst, and in a first stage this mixture, together with the entire amount or with a portion of the catalyst, is continuously esterified or transesterified;

ii) in a second stage, the transesterification or, respectively, esterification product obtained in i) is continuously precondensed to an intrinsic viscosity of from 20 to 60 $cm^3/g$ to DIN 53728;

iii) in a third stage, the product obtainable from ii) is continuously polycondensed as far as an intrinsic viscosity of from 70 to 130 $cm^3/g$ to DIN 53728, and iv) in a fourth stage, the product obtainable from iii) (polyester Q) is mixed continuously with polylactic acid, and v) preferably in a fifth stage the polymer mixture obtainable from iv) is continuously reacted in a polyaddition reaction with a chain extender D as far as an intrinsic viscosity of from 150 to 320 $cm^3/g$ to DIN 53728.

The prior art for the production of polyester mixtures comprising biodegradable polyesters Q based on aliphatic and/or aromatic dicarboxylic acids and on aliphatic dihydroxy compounds and on polymers T in particular describes batch processes, i.e. processes that use melting of the pelletized polyester Q and of the pelletized polymers T and then mixing in mixing assemblies suitable for this purpose (WO-A 06/074815 and WO-A 96/15173). The polyesters Q themselves are also mostly produced batchwise. PCT/EP2009/054116, which is not a prior publication, explains that the disadvantages arising from a batchwise procedure can be overcome by using continuous polyester synthesis in stages i) to iii). This was the first successful method of producing polyesters with an acid number smaller than 1.0 and with a viscosity range of interest in particular for extrusion applications. Since the polymers T are sensitive to acid, the abovementioned polyesters produced by continuous processes have particularly good suitability for the production of mixtures with the polymers T.

For the mixtures described in PCT/EP2009/054116, the polyester is first pelletized and then remelted and combined with the polymer melt of T. Water is introduced during this process, and damages the polymers T, which are susceptible to hydrolysis. The abovementioned pelletizing and remelting process can also introduce fish-eyes, and this is a major problem for applications such as thin films.

DETAILED DESCRIPTION OF THE INVENTION

Surprisingly, it has now been found that the process of the invention involving stages i to iv and preferably i to v as mentioned in the introduction has excellent suitability for the production of low-water-content polyester mixtures that do not produce fish-eyes.

Biodegradable polyeseters Q are aliphatic and semiaromatic polyesters as described by way of example in WO-A 96/15173 and DE-A 10 2005053068.

In particular, biodegradable polyesters are aliphatic/aromatic polyesters having the following structure:

A) an acid component composed of a1) from 30 to 99 mol % of at least one aliphatic dicarboxylic acid or its esters, or a mixture thereof, a2) from 1 to 70 mol % of at least one aromatic dicarboxylic acid or its esters, or a mixture thereof, and a3) from 0 to 5 mol % of a compound comprising sulfonate groups, where the total of the molar percentages of components a1) to a3) is 100%, and B) a diol component composed of:

b1) at least equimolar amounts with respect to component A of a $C_2$-$C_{12}$ alkanediol, or a mixture thereof, and b2) from 0 to 2% by weight, based on the amount of polyester after stage iii (corresponding to the amount of components A and B used less the reaction vapors removed), of a compound comprising at least 3 functional groups;

and, if appropriate, also one or more components selected from

C) a component selected from
  c1) at least one dihydroxy compound comprising ether functions and having the formula I

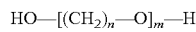
  HO—[(CH$_2$)$_n$—O]$_m$—H    (I)

where n is 2, 3 or 4 and m is a whole number from 2 to 250,
  c2) at least one hydroxycarboxylic acid of the formula IIa or IIb

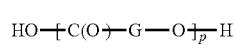
  HO—$\left[\text{C(O)}\right]$—G—O$\left.\right]_p$—H    (IIa)

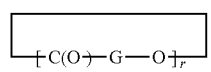
  $\left[\text{C(O)}\text{—G—O}\right]_r$    (IIb)

where p is a whole number from 1 to 1500 and r is a whole number from 1 to 4, and G is a radical selected from the group consisting of phenylene, —(CH$_2$)$_q$—, where q is a whole number from 1 to 5, —C(R)H— and —C(R)HCH$_2$, where R is methyl or ethyl,
  c3) at least one amino-C$_2$-C$_{12}$ alkanol, or at least one amino-C$_5$-C$_{10}$ cycloalkanol, or a mixture of these,
  c4) at least one diamino-C$_1$-C$_8$ alkane,
  c5) at least one aminocarboxylic acid compound, selected from the group consisting of caprolactam, 1,6-aminocaproic acid, laurolactam, 1,12-aminolauric acid, and 1,11-aminoundecanoic acid,
  or a mixture composed of c1) to c5), and D) from 0.01 to 4% by weight, based on the polymer mixture in or after stage iv, of at least one component selected from the group d1) to d4)
  d1) of a di- or oligofunctional isocyanate and/or isocyanurate,
  d2) of a di- or oligofunctional peroxide,
  d3) of a di- or oligofunctional epoxide,
  d4) of a di- or oligofunctional oxazoline, oxazine, caprolactam, and/or carbodiimide;

E) from 0 to 15% by weight, based on the amount of polyester after stage iii, of a component selected from the group e1) to e3)
  e1) of a lubricant, such as erucamide or a stearate,
  e2) of a nucleating agent, such as talc, calcium carbonate, boron nitride, PLLA-PDLA stereocomplex, polyethylene terephthalate, or polybutylene terephthalate.

In one preferred embodiment, the acid component A of the semiaromatic polyesters comprises from 30 to 70 mol %, in particular from 40 to 60 mol %, of a1 and from 30 to 70 mol %, in particular from 40 to 60 mol %, of a2. In one particularly preferred embodiment, the acid component A of the semiaromatic polyesters comprises more than 50 mol % of aliphatic dicarboxylic acid a1). A feature of these polyesters is excellent biodegradability.

Aliphatic acids and the corresponding derivatives a1 which may be used are generally those having from 2 to 40 carbon atoms, preferably from 4 to 14 carbon atoms. They may be either linear or branched. The cycloaliphatic dicarboxylic acids which may be used for the purposes of the present invention are generally those having from 7 to 10 carbon atoms and in particular those having 8 carbon atoms. In principle, however, it is also possible to use dicarboxylic acids having a larger number of carbon atoms, for example having up to 30 carbon atoms.

Examples which may be mentioned are: malonic acid, succinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, fumaric acid, 2,2-dimethylglutaric acid, suberic acid, dimer fatty acid (e.g. Empol® 1061 from Cognis) 1,3-cyclopentanedicarboxylic acid, 1,4-cyclohexanedicarboxylic acid, 1,3-cyclohexanedicarboxylic acid, diglycolic acid, itaconic acid, maleic acid, maleic anhydride, and 2,5-norbornanedicarboxylic acid.

Ester-forming derivatives of the abovementioned aliphatic or cycloaliphatic dicarboxylic acids which may also be used and which may be mentioned are in particular the di-C$_1$-C$_6$-alkyl esters, such as dimethyl, diethyl, di-n-propyl, diisopropyl, di-n-butyl, diisobutyl, di-tert-butyl, di-n-pentyl, diisopentyl or di-n-hexyl esters. It is also possible to use anhydrides of the dicarboxylic acids.

The dicarboxylic acids or their ester-forming derivatives may be used here individually or in the form of a mixture composed of two or more of these.

It is preferable to use succinic acid, adipic acid, azelaic acid, sebacic acid, brassylic acid, or their respective ester-forming derivatives, or a mixture thereof. It is particularly preferable to use succinic acid, adipic acid, or sebacic acid, or their respective ester-forming derivatives, or a mixture thereof. It is particularly preferable to use adipic acid or its ester-forming derivatives, for example its alkyl esters or a mixture of these. Sebacic acid or a mixture of sebacic acid with adipic acid is preferably used as aliphatic dicarboxylic acid when polymer mixtures having "hard" or "brittle" components ii), such as polyhydroxybutyrate or in particular polylactide, are prepared. Succinic acid or a mixture of succinic acid with adipic acid is preferably used as aliphatic dicarboxylic acid when preparing polymer mixtures with "soft" or "tough" components ii), examples being polyhydroxybutyrate-co-valerate or poly-3-hydroxybutyrate-co-4-hydroxybutyrate.

Succinic acid, azelaic acid, sebacic acid, and brassylic acid have the additional advantage of being available in the form of renewable raw materials.

Aromatic dicarboxylic acids a2 which may be mentioned are generally those having from 8 to 12 carbon atoms and preferably those having 8 carbon atoms. By way of example, mention may be made of terephthalic acid, isophthalic acid, 2,6-naphthoic acid and 1,5-naphthoic acid, and also ester-forming derivatives of these. Particular mention may be made here of the di-C$_1$-C$_6$-alkyl esters, e.g. dimethyl, diethyl, di-n-propyl, diisopropyl, di-n-butyl, diisobutyl, di-tert-butyl, di-n-pentyl, diisopentyl, or di-n-hexyl esters. The anhydrides of the dicarboxylic acids a2 are also suitable ester-forming derivatives.

However, in principle it is also possible to use aromatic dicarboxylic acids a2 having a greater number of carbon atoms, for example up to 20 carbon atoms.

The aromatic dicarboxylic acids or ester-forming derivatives of these a2 may be used individually or as a mixture of two or more of these. It is particularly preferable to use terephthalic acid or its ester-forming derivatives, such as dimethyl terephthalate.

The compound used comprising sulfonate groups is usually one of the alkali metal or alkaline earth metal salts of a dicarboxylic acid comprising sulfonate groups or ester-forming derivatives thereof, preferably alkali metal salts of 5-sulfoisophthalic acid or a mixture of these, particularly preferably the sodium salt.

According to one of the preferred embodiments, the acid component A comprises from 40 to 60 mol % of a1, from 40 to 60 mol % of a2, and from 0 to 2 mol % of a3.

The diols B are generally selected from branched or linear alkanediols having from 2 to 12 carbon atoms, preferably from 4 to 6 carbon atoms.

Examples of suitable alkanediols are ethylene glycol, 1,2-propanediol, 1,3-propanediol, 1,2-butanediol, 1,4-butanediol, 1,5-pentanediol, 1,6-hexanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethyl-1,3-propanediol(neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, in particular in combination with adipic acid as component a1), and 1,3-propanediol, in particular in combination with sebacic acid as component a1). 1,3-Propanediol has the additional advantage of being obtainable in the form of a renewable raw material. It is also possible to use mixtures of different alkanediols.

The ratio of component b1 (diol) to diacids A generally set in stages i) and ii) of the process is from 1.5 to 2.5 and preferably from 1.8 to 2.2.

The compounds b2) preferably comprise crosslinking agents comprising at least three functional groups. Particularly preferred compounds have from three to six hydroxy groups. Examples that may be mentioned are: tartaric acid, citric acid, malic acid; trimethylolpropane, trimethylolethane; pentaerythritol; polyethertriols, and glycerol, trimesic acid, trimellitic acid, trimellitic anhydride, pyromellitic acid, and pyromellitic dianhydride. Preference is given to polyols, such as trimethylolpropane, pentaerythritol, and in particular glycerol. The compounds b2 can act as branching agents or else as crosslinking agents. By using components b2, it is possible to construct biodegradable polyesters which are pseudoplastic. The rheology of the melts improves; the biodegradable polyesters are easier to process, for example easier to draw by melt-solidification processes to give foils. The compounds b2 have a shear-thinning effect, and viscosity therefore decreases under load.

The amounts used of the compounds b2 are preferably from 0.01 to 2% by weight, with preference from 0.05 to 1% by weight, with particular preference from 0.08 to 0.20% by weight, based on the amount of polymer after stage iii).

The polyesters on which the polyester mixtures of the invention are based can comprise further components alongside components A and B.

Suitable dihydroxy compounds c1 are diethylene glycol, triethylene glycol, polyethylene glycol, polypropylene glycol and polytetrahydrofuran (polyTHF), particularly preferably diethylene glycol, triethylene glycol and polyethylene glycol, and mixtures of these may also be used, as may compounds which have different variables n (see formula I), for example polyethylene glycol which comprises propylene units (n=3), obtainable, for example, by using methods of polymerization known per se and polymerizing first with ethylene oxide and then with propylene oxide, and particularly preferably a polymer based on polyethylene glycol with different variables n, where units formed from ethylene oxide predominate. The molar mass ($M_n$) of the polyethylene glycol is generally selected within the range from 250 to 8000 g/mol, preferably from 600 to 3000 g/mol.

According to one of the preferred embodiments for preparing the semiaromatic polyesters use may be made, for example, of from 15 to 98 mol %, preferably from 60 to 99.5 mol %, of the diols B and from 0.2 to 85 mol %, preferably from 0.5 to 30 mol %, of the dihydroxy compounds c1, based on the molar amount of B and c1.

Hydroxycarboxylic acid c2) that can be used for the preparation of copolyesters is: glycolic acid, D-, L-, or D,L-lactic acid, 6-hydroxyhexanoic acid, cyclic derivatives of these, such as glycolide(1,4-dioxane-2,5-dione), D- or L-dilactide (3,6-dimethyl-1,4-dioxane-2,5-dione), p-hydroxybenzoic acid, or else their oligomers and polymers, such as 3-polyhydroxybutyric acid, polyhydroxyvaleric acid, polylactide (for example that obtainable in the form of NatureWorks® (Cargill)), or else a mixture of 3-polyhydroxybutyric acid and polyhydroxyvaleric acid (the latter being obtainable as Biopol® from Zeneca) and, for preparing semiaromatic polyesters, particularly preferably the low-molecular-weight and cyclic derivatives thereof.

Examples of amounts which may be used of the hydroxycarboxylic acids are from 0.01 to 50% by weight, preferably from 0.1 to 40% by weight, based on the amount of A and B.

The amino-$C_2$-$C_{12}$ alkanols or amino-$C_5$-$C_{10}$ cycloalkanols (component c3) used, which for the purposes of the present invention also include 4-aminomethylcyclohexanemethanol, are preferably amino-$C_2$-$C_6$ alkanols, such as 2-aminoethanol, 3-aminopropanol, 4-aminobutanol, 5-aminopentanol or 6-aminohexanol, or else amino-$C_5$-$C_6$ cycloalkanols, such as aminocyclopentanol and aminocyclohexanol, or a mixture of these.

The diamino-$C_1$-$C_8$ alkanes (component c4) used are preferably diamino-$C_4$-$C_6$ alkanes, such as 1,4-diaminobutane, 1,5-diaminopentane or 1,6-diaminohexane (hexamethylenediamine, "HMD").

In one preferred embodiment for preparing the semiaromatic polyesters, use may be made of from 0.5 to 99.5 mol %, preferably from 0.5 to 50 mol %, of c3, based on the molar amount of B, and of from 0 to 50 mol %, preferably from 0 to 35 mol %, of c4, based on the molar amount of B.

The component c5 used can comprise aminocarboxylic acids selected from the group consisting of caprolactam, 1,6-aminocaproic acid, laurolactam, 1,12-aminolauric acid, and 1,11-aminoundecanoic acid.

The amounts generally used of c5 are from 0 to 20% by weight, preferably from 0.1 to 10% by weight, based on the total amount of components A and B.

The component d1 used comprises an isocyanate or a mixture of various isocyanates. It is possible to use aromatic or aliphatic diisocyanates. However, it is also possible to use isocyanates of higher functionality.

For the purposes of the present invention, an aromatic diisocyanate d1 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, or xylylene diisocyanate.

Among these, particular preference is given to diphenylmethane 2,2'-, 2,4'-, or 4,4'-diisocyanate as component d1. The latter diisocyanates are generally used in the form of mixture.

An isocyanate d1 that can also be used, having three rings, is tri(4-isocyanato-phenyl)methane. Polynuclear aromatic diisocyanates are produced by way of example during production of diisocyanates having one or two rings.

Component d2 can also comprise subordinate amounts of uretdione groups, for example up to 5% by weight, based on the total weight of component d1, for example for capping of the isocyanate groups.

For the purposes of the present invention, an aliphatic diisocyanate d1 is especially any of the linear or branched alkylene diisocyanates or cycloalkylene diisocyanates having from 2 to 20 carbon atoms, preferably from 3 to 12 carbon atoms, examples being hexamethylene 1,6-diisocyanate, isophorone diisocyanate, or methylenebis(4-isocyanatocyclohexane). Particularly preferred aliphatic diisocyanates d1 are isophorone diisocyanate and especially hexamethylene 1,6-diisocyanate.

Among the preferred isocyanurates are the aliphatic isocyanurates that derive from alkylene diisocyanates or from cycloalkylene diisocyanates, where these have from 2 to 20 carbon atoms, preferably from 3 to 12 carbon atoms, examples being isophorone diisocyanate or methylenebis(4-isocyanatocyclohexane). These alkylene diisocyanates can be either linear or branched compounds. Particular preference is given to isocyanurates based on n-hexamethylene diisocyanate, examples being cyclic trimers, pentamers, or higher oligomers of hexamethylene 1,6-diisocyanate.

The amounts generally used of component d1 are from 0.01 to 4% by weight, preferably from 0.05 to 2% by weight, particularly preferably from 0.2 to 1.2% by weight, based on the amount of polymer after stage iii).

Examples of suitable di- or oligofunctional peroxides (component d2) are the following compounds: benzoyl peroxide, 1,1-bis(tert-butylperoxy)-3,3,5-trimethylcyclohexane, 1,1-bis(tert-butylperoxy)methylcyclododecane, n-butyl 4,4-bis(butylperoxy)valerate, dicumyl peroxide, tert-butyl peroxybenzoate, dibutyl peroxide, α,α-bis(tert-butyl-peroxy)diisopropylbenzene, 2,5-dimethyl-2,5-di(tert-butylperoxy)hexane, 2,5-dimethyl-2,5-di(tert-butylperoxy)hex-3-yne, and tert-butylperoxycumene.

The amount used of component d2 is from 0.01 to 4% by weight, preferably from 0.1 to 2% by weight, and particularly preferably from 0.2 to 1% by weight, based on the biopolymer.

The component d3 used can comprise difunctional or oligofunctional epoxides, such as: hydroquinone, diglycidyl ether, resorcinol diglycidyl ether, 1,6-hexanediol diglycidyl ether, and hydrogenated bisphenol A diglycidyl ether. Other examples of epoxides comprise diglycidyl terephthalate, diglycidyl tetrahydrophthalate, diglycidyl hexahydro-phthalate, dimethyldiglycidyl phthalate, phenylene diglycidyl ether, ethylene diglycidyl ether, trimethylene diglycidyl ether, tetramethylene diglycidyl ether, hexamethylene diglycidyl ether, sorbitol diglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentyl glycol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, and polybutylene glycol diglycidyl ether.

A particularly suitable component d3a is a copolymer containing epoxy groups and based on styrene, acrylic ester and/or methacrylic ester d3a. The units bearing epoxy groups are preferably glycidyl(meth)acrylates. Compounds that have proven advantageous are copolymers having a proportion of more than 20% by weight, particularly preferably more than 30% by weight, and with particular preference more than 50% by weight, of glycidyl methacrylate in the copolymer. The epoxy equivalent weight (EEW) in these polymers is preferably from 150 to 3000 g/equivalent, particularly preferably from 200 to 500 g/equivalent. The average molecular weight (weight average) $M_w$ of the polymers is preferably from 2000 to 25 000, in particular from 3000 to 8000. The average molecular weight (number average) $M_n$ of the polymers is preferably from 400 to 6000, in particular from 1000 to 4000. The polydispersity (Q) is generally from 1.5 to 5. Copolymers of the abovementioned type containing epoxy groups are marketed by way of example by BASF Resins B.V. with trademark Joncryl® ADR. Particularly suitable chain extenders are Joncryl® ADR 4368, long-chain acrylates as described in EP Application No. 08166596.0, and Cardura® E10 from Shell.

The amount of component d3 used, based on the biopolymer, is from 0.01 to 4% by weight, preferably from 0.1 to 2% by weight, and particularly preferably from 0.2 to 1% by weight. Component d3 can also be used as acid scavenger. In this embodiment, it is preferable that the concentration used of d3 is from 0.01 to 0.5% by weight (prior to, in, or after stage iv), and that this is followed by chain extension using component d1, d2 and/or d3a (stage v), the concentration of which added is preferably from 0.2 to 1.2% by weight.

The component d4 used can comprise di- or oligofunctional oxazolines, oxazines, caprolactams, and/or carbodiimides.

Bisoxazolines are generally obtainable by the process disclosed in Angew. Chem. Int. Ed., vol. 11 (1972), pp. 287-288. Particularly preferred bisoxazolines and bisoxazines are those in which the bridging member is a single bond, a $(CH_2)_z$-alkylene group, where z=2, 3, or 4, e.g. methylene, ethane-1,2-diyl, propane-1,3-diyl, or propane-1,2-diyl, or a phenylene group. Particularly preferred bisoxazolines that may be mentioned are 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene. Further examples are: 2,2'-bis(2-oxazoline), 2,2'bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(4-methyl-2-oxazoline), 2,2'-p-phenylenebis(4,4'dimethyl-2-oxazoline), 2,2'-m-phenylenebis(4-methyl-2-oxazoline), 2,2'-m-phenylenebis(4,4'-dimethyl-2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline).

Preferred bisoxazines are 2,2'-bis(2-oxazine), bis(2-oxazinyl)methane, 1,2-bis(2-oxazinyl)ethane, 1,3-bis(2-oxazinyl)propane, or 1,4-bis(2-oxazinyl)butane, in particular 1,4-bis(2-oxazinyl)benzene, 1,2-bis(2-oxazinyl)benzene, or 1,3-bis(2-oxazinyl)benzene.

Carbodiimides and polymeric carbodiimides are marketed by way of example by Lanxess with trademark Stabaxol® or by Elastogran with trademark Elastostab®.

Examples are: N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, p-phenylenebisdi-o-tolylcarbodiimide, p-phenylenebisdicyclohexylcarbodiimide, hexamethylenebisdicyclohexylcarbodiimide, 4,4'-dicyclohexylmethanecarbodiimide, ethylenebisdiphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, tert-butylisopropylcarbodiimide, di-β-naphthylcarbodiimide, and di-tert-butylcarbodiimide.

The amount of component d4 used, based on the biopolymer, is from 0.01 to 4% by weight, preferably from 0.1 to 2% by weight, and particularly preferably from 0.2 to 1% by weight. Component d4 can also be used as acid scavenger. In this embodiment, it is preferable that the concentration used of d4 is from 0.01 to 0.5% by weight in or after stage iv, and that this is followed by chain extension using component d1, d2 and/or d3a (stage v), the concentration of which added is preferably from 0.2 to 1.2% by weight.

In one preferred embodiment of the process of the invention, between stages iii and iv, or during stage iv, a component selected from the following group is added: lubricants (e1), nucleating agents (e2), and/or compatibilizers (e3). It is particularly preferable that component E is added at the end of stage iii. It is particularly preferable to mix one or more additives, such as lubricants (e1), nucleating agents (e2), and/or compatibilizers/chain extenders (d3), and/or acid scavengers (d4) with the polymer T to give a masterbatch, and to admix said masterbatch in stage iv.

Particular lubricants or mold-release agents (component e1) that have proven successful are hydrocarbons, fatty alcohols, higher carboxylic acids, metal salts of higher carboxylic acids, e.g. calcium stearate or zinc stearate, fatty acid amides, such as erucamide, and types of wax, e.g. paraffin waxes, beeswax or montan waxes. Preferred lubricants are erucamide and/or types of wax and particularly preferably combinations of these lubricants. Preferred types of wax are beeswax and ester waxes, in particular glycerol monostearate or dimethylsiloxane, or polydimethylsiloxane, e.g. Belsil® DM from Wacker. By adding the lubricants prior to chain extension, the lubricants can be linked to some extent to the polymer chain. This method can provide effective suppression of premature exudation of the lubricants from the finished polymer compositions.

The amount added of component e1 is generally from 0.05 to 2.0% by weight and preferably from 0.1 to 1.0% by weight, based on the polymer composition at the end of stage iii.

Nucleating agents (components e2) that can be used are generally inorganic compounds, such as talc, chalk, mica, boron nitride, silicon oxides, or barium sulfate, and organic compounds, such as beta-cyclodextrin or decamethylenedicarboxylic dihydrazide. Compounds that have proven particularly successful for the polyesters of the invention are aromatic polyesters, such as polyethylene terephthalate and in particular polybutylene terephthalate, and PLLA-PDLA stereocomplex. Surprisingly, it has been found that the nucleating agent e2 is substantially more effective when added after stage iii than when added after stage iv. The amount used of the nucleating agent can be reduced to about half for the same technical effect, e.g. rapid crystallization, and avoidance of tack. In other words, polymer compositions are obtained which, although they have very good biodegradability by virtue of their low content of aromatic blocks, nevertheless are non-tacky by virtue of improved crystallization behavior.

The amount of component e2 added is generally from 0.05 to 10.0% by weight, preferably from 0.05 to 5.0% by weight, and particularly preferably from 0.1 to 1.0% by weight, based on the polymer composition at the end of stage iii.

Preferred biodegradable semiaromatic polyesters Q comprise, as aliphatic polycarboxylic acid (component a1)), succinic acid, adipic acid, or sebacic acid, esters thereof, or a mixture thereof; as aromatic dicarboxylic acid (component a2)), terephthalic acid or esters thereof;

as diol component (component B), 1,4-butanediol or 1,3-propanediol,
as component b2), glycerol, pentaerythritol, trimethylolpropane, and
as component d1), hexamethylene diisocyanate.

The process of the invention (stages i to iii) is also suitable for the production of aliphatic polyesters Q'. Aliphatic polyesters are polyesters composed of aliphatic $C_2$-$C_{12}$ alkanediols and of aliphatic $C_4$-$C_{36}$ alkanedicarboxylic acids, e.g. polybutylene succinate (PBS), polybutylene adipate (PBA), polybutylene succinate adipate (PBSA), polybutylene succinate sebacate (PBSSe), polybutylene sebacate adipate (PBSeA), polybutylene sebacate (PBSe), or corresponding polyesteramides. The aliphatic polyesters are marketed by Showa Highpolymers as Bionolle and by Mitsubishi as GSPla. More recent developments are described in EP08165370.1.

The intrinsic viscosities of the aliphatic polyesters to DIN 53728 are generally from 150 to 320 cm$^3$/g and preferably from 150 to 250 cm$^3$/g.

The MVR (melt volume rate) to EN ISO 1133 (190° C., 2.16 kg weight) is generally from 0.1 to 70 cm$^3$/10 min, preferably from 0.8 to 70 cm$^3$/10 min, and in particular from 1 to 60 cm$^3$/10 min.

The acid numbers to DIN EN 12634 are generally from 0.01 to 1.2 mg KOH/g, preferably from 0.01 to 1.0 mg KOH/g, and particularly preferably from 0.01 to 0.7 mg KOH/g.

The molar mass ($M_n$) of the polyesters Q after stage iii is generally in the range from 1000 to 100 000 g/mol, in particular in the range from 9000 to 75 000 g/mol, preferably in the range from 20 000 to 50 000 g/mol, and their molar mass (Mw) is generally in the range from 50 000 to 300 000 g/mol, preferably from 75 000 to 200 000 g/mol, and their Mw/Mn ratio is generally from 1 to 6, preferably from 2 to 4. The melting point is in the range from 60 to 170° C., preferably in the range from 80 to 150° C.

The intrinsic viscosities of the polyesters Q after stage iii to DIN 53728 are generally from 60 to 170 cm$^3$/g. The intrinsic viscosities hereinafter always have the dimension cm$^3$/g.

It is also desirable, alongside high intrinsic viscosity, to provide aliphatic aromatic copolyesters which have a low acid number to DIN EN 12634. As the acid number of the aliphatic/aromatic copolyesters becomes lower, the polyesters become more resistant to hydrolysis, either on their own or in a mixture with biopolymers such as starch (thermoplastified or not plastified), polylactide (PLA), polyhydroxyalkanoates, aliphatic polyester, such as Bionolle®, cellulose, or polycaprolactone. The storage stability of the polyester (mixtures) improves correspondingly.

Furthermore, the prepolyesters obtainable in stage iii) with small acid number to DIN EN 12634 of <1.2 mg KOH/g, preferably <1.0 mg KOH/g, particularly preferably <0.9 mg KOH/g perform better when subjected to chain extension. The result is short residence times with more effective molar mass increase and less increase in the acid number in the subsequent stage v). It is possible to achieve almost complete avoidance of side reactions or undesired formation of fisheyes. The acid number can preferably be lowered still further if the polyesters Q comprised in stage iii) are treated with acid scavengers, such as d3 and/or d4, for example in stage iv, and only then are subjected to chain extension v.

Alongside the polyesters Q, polymers T are used in the polymer mixtures and are selected from the group consisting of: polylactic acid, polycaprolactone, polypropylene carbonate, polyglycolide, aliphatic polyester, cellulose acetate, and polyhydroxyalkanoate.

By way of example, polylactic acid is suitable as polymer T.

It is preferable to use polylactic acid with the following property profile:
  a melt volume flow rate (MVR at 190° C. with 2.16 kg to ISO 1133) of from 0.5 to 200 ml/10 minutes, preferably from 3 to 70 ml/10 minutes, particularly preferably from 5 to 50 ml/10 minutes;
  a melting point below 240° C.;
  a glass transition temperature (Tg) above 55° C.:
  water content below 1000 ppm:
  residual monomer content (lactide) below 0.3%;
  acid number, measured to DIN EN 12634, below 3 mg KOH/g, preferably below 1 mg KOH/g;
  molecular weight above 50 000 daltons.

As a function of the application, preferred polylactic acids are of low-viscosity liquids, for example those for paper coating (NatureWorks® 6201 D, 6202 D, 6251 D, 3051 D, and in particular 3251 D (polylactic acid from NatureWorks)) or higher-viscosity polylactic acid for example for film applications, preferably NatureWorks® 4042 D. It is also possible to use mixtures of various polylactic acids.

Polyhydroxyalkanoates are primarily poly-4-hydroxybutyrates and poly-3-hydroxybutyrates, but they also include copolyesters of the abovementioned hydroxybutyrates with 3-hydroxyvalerates or 3-hydroxyhexanoate. Poly-3-hydroxybutyrate-co-4-hydroxybutyrates are in particular known from Metabolix. They are known by the trademark Mirel®. Poly-3-hydroxybutyrate-co-3-hydroxyhexanoates are known from P&G or Kaneka. Poly-3-hydroxybutyrates are marketed by way of example by PHB Industrial with trademark Biocycle® and by Tianan as Enmat®.

The molecular weight Mw of the polyhydroxyalkanoates is generally from 100 000 to 1 000 000 and preferably from 300 000 to 600 000.

Polycaprolactone is marketed as Placcel® from Daicel.

Polypropylene carbonate means copolymers of propylene oxide and carbon dioxide (see, for example, WO 07/125039).

Polymer T can also comprise aliphatic polyesters Q' which have been produced continuously or batchwise. These are preferably by way of example mixed in stage iv with the semiaromatic polyesters Q continuously produced in stage iii.

In stage 4 it is also possible to introduce a mixture of a plurality of polymers T. By way of example, suitable polymers T are mixtures composed of polylactic acid and of aliphatic polyester Q', and also polylactic acid and polypropylene carbonate.

The polymer mixtures mentioned in the introduction have high biodegradability together with good film properties.

Typical polyester mixtures obtainable by the process of the invention comprise:
  a) from 10 to 80% by weight, preferably from 40 to 75% by weight, and particularly preferably from 50 to 70% by weight, of a biodegradable polyester (Q) composed of aliphatic or aliphatic and aromatic dicarboxylic acids and of aliphatic dihydroxy compounds, and
  b) from 20 to 90% by weight, preferably from 25 to 60% by weight, and particularly preferably from 30 to 50% by weight, of one or more polymers (T) selected from the group consisting of: polylactic acid, polycaprolactone, polypropylene carbonate, and polyhydroxyalkanoate.

These polyester mixtures are biodegradable.

For the purposes of the present invention, compliance with the feature "biodegradable" is achieved for a substance or a mixture of substances when said substance or the mixture of substances has a percentage degree of biodegradation of at least 90% to DIN EN 13432.

The consequence of the biodegradability is generally that the polyesters or polyester mixtures decompose within an appropriate and demonstrable period. The degradation can take place enzymatically, hydrolytically, oxidatively, and/or via exposure to electromagnetic radiation, such as UV radiation, and can mostly be mainly brought about by exposure to microorganisms, such as bacteria, yeasts, fungi, and algae. An example of a method of quantifying biodegradability mixes polyester with compost and stores it for a certain time. By way of example, DIN EN 13432 passes $CO_2$-free air through ripened compost during the composting process, and the compost is subjected to a defined temperature profile. Biodegradability is defined here as a percentage degree of biodegradation by way of the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit marked signs of degradation after just a few days of composting, examples being fungal growth, cracking, and perforation.

Other methods for determining biodegradability are described by way of example in ASTM D 5338 and ASTM D 6400.

The process of the invention is described in more detail below.

Components A, B, and, if appropriate, C are mixed in a preliminary stage. The materials generally premixed are 1.0 mol equivalent of a mixture composed of aliphatic and aromatic dicarboxylic acids or their esters (component A), from 1.1 to 1.5 mol equivalents, preferably from 1.2 to 1.4 mol equivalents, of aliphatic dihydroxy compounds (component b1),
and from 0 to 2% by weight, preferably from 0.01 to 0.5% by weight, based on the amount of polymer after stage iii), of a compound b2; if appropriate, further comonomers (component C) are also premixed.

In one preferred procedure, the dicarboxylic acids are used in the form of free acids (component A). The mixture here is mixed in the abovementioned mixing ratios—without addition of any catalyst—to give a paste, the temperature of which is usually controlled to from 20 to 70° C.

As an alternative to this, the liquid esters of the dicarboxylic acids (component A) are mixed with the dihydroxy compound and, if appropriate, further comonomers, in the abovementioned mixing ratios—without addition of any catalyst—generally at a temperature of from 140 to 200° C.

In a further alternative, one or both dicarboxylic acids is/are esterified in a preliminary stage with the aliphatic dihydroxy compounds to give a purely aliphatic or aromatic polyester, and this is then mixed with the respective other dicarboxylic acid and further aliphatic dihydroxy compound, and also, if appropriate, compound b2. By way of example, polybutylene terephthalate and/or polybutylene adipate can be used in this preliminary stage.

In stage i), the (preliminary-stage) liquid, slurry, and/or paste described above, composed of aliphatic and aromatic dicarboxylic acids (A) and of an aliphatic dihydroxy compound (b1), if appropriate compound (b2), and of further comonomers (component C) is esterified in the presence of from 0.001 to 1% by weight, preferably from 0.03 to 0.2% by weight, based on the amount of polymer after stage iii, of a catalyst, as far as an intrinsic viscosity which is generally from 5 to 15 cm$^3$/g to DIN 53728.

The excess diol component is generally removed by distillation, and after, for example, distillative purification, returned to the circuit.

In stage i), either the entire amount or a portion—preferably from 50 to 80 parts—of the catalyst is metered in. The usual catalysts used are zinc compounds, aluminum compounds, and in particular titanium compounds. Another advantage of titanium catalysts, such as tetrabutyl orthotitanate or tetra(isopropyl) orthotitanate, when compared with the tin compounds, antimony compounds, cobalt compounds, and lead compounds often used in the literature, e.g. tin dioctanoate, is that if residual amounts of the catalyst or downstream products of the catalyst remain within the product they are less toxic. This circumstance is particularly important in the biodegradable polyesters, since they pass directly into the environment, for example in the form of composting bags or mulch films.

Simultaneously, in stage i), a temperature of from 180 to 260° C. and preferably from 220 to 250° C. and a pressure of from 0.6 to 1.2 bar and preferably from 0.8 to 1.1 bar are set. Stage i) can be carried out in a mixing assembly, such as a hydrocyclone. Typical residence times are from 1 to 2 hours.

Stage i) and ii) are advantageously carried out in a single reactor, such as a tower reactor (see, for example, WO 03/042278 and DE-A 199 29 790), the reactor having the internals appropriate for each stage.

Further component b1, and also the optional component c), can be added, if appropriate, in stage i) and/or ii). The ratio of component B (diol) to diacids A set in stage i) is generally from 1.5 to 2.5 and preferably from 1.8 to 2.2.

In stage ii), the liquid obtained in stage i (esterification) is fed, together with, if appropriate, the residual amount of catalyst, into a reactor appropriate for the precondensation reaction. Reactors which have proven suitable for the precondensation reaction are a tube-bundle reactor, a reactor cascade, or a bubble column, and in particular a downflow cascade, if appropriate with degassing unit (procedure iia). The reaction temperatures set are generally from 230 to 270° C., preferably from 240 to 260° C., and the pressures set at the start of stage ii) are generally from 0.1 to 0.5 bar, preferably from 0.2 to 0.4 bar, and the pressures set at the end of stage ii) are generally from 5 to 100 mbar, preferably from 5 to 20 mbar. Using residence times of from 60 to 160 minutes, it is possible to prepare aliphatic/aromatic prepolyesters whose intrinsic viscosity is from 20 to 60 cm$^3$/g, preferably from 25 to 55 cm$^3$/g, to DIN 53728. The acid numbers to DIN EN 12634 of the prepolyesters can still vary greatly after stage ii) as a function of the preparation method. If the preliminary stage starts from the free dicarboxylic acids, the acid numbers at the end of stage ii) are still relatively high; however they then fall in stage iii). If the preliminary stage starts from the corresponding dicarboxylic esters, the acid number at the end of stage ii) is comparatively small. However, in this case the acid numbers increase during the course of stage iii). The acid numbers to DIN EN 12634 at the end of stage ii) are generally from 0.7 to 2 mg KOH/g.

Reactors which have proven particularly advantageous for the precondensation reaction ii) are the tower reactors described in detail in WO-A 03/042278 and WO-A 05/042615, in which the product stream is passed cocurrently through a single- or multistage falling-film evaporator, where the reaction vapors—in particular water, THF, and, if dicarboxylic esters are used, alcohols—are drawn off at a plurality of sites distributed over the reactor (procedure iib). The cocurrent procedure described in WO-A 03/042278 and WO-A 05/042615, with continuous removal of the reaction vapors—at least at a plurality of sites—is expressly incorporated herein by way of reference. This procedure in particular has the following advantages:

- pumps for conveying of the product stream can substantially be omitted; a simpler gravimetric-flow method can be used for the progress of the product; the reactor can be run at slightly superatmospheric pressure, or atmospheric pressure, or using slightly subatmospheric pressure (see above),
- in a procedure which is in any case very non-aggressive, the continuous removal of the reaction vapors in situ from the reaction mixture shifts the equilibrium to the side of the reaction products; the rapid removal of the reaction vapors moreover avoids, or at least suppresses, side-reactions;
- using the procedure described above, it is generally possible to prepare aliphatic/aromatic prepolyesters whose intrinsic viscosity is from 25 to 55 cm$^3$/g to DIN 53728; these prepolyesters moreover have very low acid numbers to DIN EN 12634.

The reaction vapors, consisting essentially of water and, if dicarboxylic esters are used, of alcohol, or—if the diol 1,4-butanediol is used—of excess diol and THF by-product, are purified by conventional distillation processes and returned to the process.

In the polycondensation step iii), a deactivator for the catalyst is admixed, if appropriate, with the precondensed polyester. Deactivators that can in particular be used are phosphorus compounds: either organophosphites, such as phosphonous acid or phosphorous acid. It is particularly advisable to use deactivators if high-reactivity titanium catalysts are used. The amounts that can be added of the deactivators are from 0.001 to 0.1% by weight, preferably from 0.01 to 0.05% by weight, based on the amount of polymer after stage iii). The Ti/P ratio preferably set is from 1.3-1.5:1 and particularly preferably from 1.1-1.3:1.

In the polycondensation step iii), a color stabilizer is, if appropriate, admixed with the precondensed polyester for the condensation process. Phosphorus compounds can in particular be used as color stabilizer. Examples are phosphoric acid, phosphorous acid, triphenyl phosphite, triphenyl phosphate, IrgafosPEPQ, and sodium hypophosphite, and sodium phosphite. These phosphorus compounds can also be used in the form of a mixture. The use of color stabilizers generally reduces the condensation rate. Triphenyl phosphate is a particularly suitable color stabilizer because there is no adverse effect on condensation rate.

The amount that can be added of the color stabilizers is from 0.001 to 1.5% by weight, preferably from 0.01 to 1.0% by weight, based on the amount of polymer after stage iii). The Ti/P ratio preferably set is 1.0:0.3-1.0 and particularly preferably 1.0:0.5-1.0 (mol/mol).

In the polycondensation step iii), an activator is, if appropriate, admixed with the precondensed polyester for the condensation process. Phosphorus compounds can in particular be used as activator. Examples are disodium hydrogenphosphate, calcium hypophosphite, calcium phosphite, calcium phosphate, sodium hypophosphite, sodium phosphite, triphenyl phosphite, triphenyl phosphate, trimethyl phosphate, triethyl phosphate, tripropyl phosphate, tributyl phosphate, Irgafos 168. These phosphorus compounds can also be used in the form of a mixture. Particularly suitable activators are disodium hydrogenphosphate and sodium phosphite.

The amount that can be added of the activators is from 0.001 to 1.5% by weight, preferably from 0.01 to 1.0% by weight, based on the amount of polymer after stage iii). The Ti/P ratio preferably set is 1.0-1.5:1 and particularly preferably 1.1-1.3:1 (mol/mol).

Combined use of color stabilizer and activator is of particular interest, an example being triphenyl phosphate/disodium hydrogenphosphate.

The polycondensation reaction takes place in what is known as a finisher. Finishers which have proven particularly suitable are reactors such as a rotating-disk reactor or a cage reactor, these being as described in U.S. Pat. No. 5,779,986 and EP 719582. The latter reactor, in particular, takes account of the fact that viscosity of the polyester increases with increasing reaction time. The reaction temperatures set are generally from 220 to 270° C., preferably from 230 to 250° C., and the pressures set are generally from 0.2 to 5 mbar, preferably from 0.5 to 3 mbar. Using residence times of from 30 to 90 minutes, preferably from 40 to 80 minutes, it is possible to prepare aliphatic/aromatic polyesters whose intrinsic viscosity is 70 to 130 cm$^3$/g to DIN 53728 and whose acid numbers to DIN EN 12634 are from 0.5 to 1.2 mg KOH/g, preferably from 0.6 to 0.9 mg KOH/g. Typical molecular weights (Mn) are from 10 000 to 25 000, and typical molecular weights (Mw) are from 35 000 to 70 000 in this stage.

In stage iv, the two polymer streams Q and T are combined in a mixing assembly suitable for this purpose. By way of example, a List reactor, an extruder, or a static mixer is suitable here.

It is particularly preferable to mix one or more additives, such as lubricants (e1), nucleating agents (e2), and/or compatibilizers/chain extenders (d3), and/or acid scavengers (d4) with the polymer T to give a masterbatch and to admix this masterbatch in stage iv.

The four-stage process of the invention is capable of efficient production of polyester mixtures which have good processability and which are of interest for applications such as paper coating which require relatively low viscosity.

Numerous extrusion applications require relatively viscous polymer mixtures, examples being film applications and foam applications. Addition of stage v is clearly useful here.

In the chain-extension process (optional stage v), the polymer mixture is fed together with from 0.01 to 4% by weight, preferably from 0.1 to 2% by weight, and particularly preferably from 0.5 to 1.2% by weight, based on the polyester, into an extruder, a continuous kneader (List reactor), or a static mixer. Examples of internals that may be mentioned are: in the case of a static mixer, SMR, SMX, or SMXL elements, or a combination thereof, can be used, for example from Sulzer Chemtech AG, Switzerland. Examples of a List reactor, as a function of application sector, are: a single-screw DISCOTHERM B or twin-screw CRP and ORP reactors. The extruders used can be single- or twin-screw extruders.

Chain extenders that can be used are the isocyanates or isocyanurates d1, peroxides d2, and epoxides d3a, these having been described above. By way of example, these are diisocyanates selected from the group consisting of tolylene 2,4-diisocyanate, tolylene 2,6-diisocyanate, diphenylmethane 4,4'- and 2,4'-diisocyanate, naphthylene 1,5-diisocyanate, xylylene diisocyanate, hexamethylene diisocyanate, pentamethylene diisocyanate, isophorone diisocyanate, and methylenebis(4-isocyanatocyclohexane). Hexamethylene diisocyanate is particularly preferred.

For production of polyesters in the claimed viscosity range simultaneously having low acid numbers it can be advantageous to add what are known as acid scavengers, such as components d3 and d4 described in the introduction. The concentration used here is preferably from 0.01 to 2.0% by weight and in particular from 0.02 to 1.0% by weight, based on the polymer mixture. The acid scavengers are usefully added at the start of, during, or at the end of stage iii, or in a preceding step together with the mixing procedure in stage iv. Chain extenders having particularly good suitability are components d1, d2, and d3a. However, the acid scavengers d3 and d4 can also be added after addition of the chain extenders d1 and d2.

The chain extension reaction (polyaddition, stage v) takes place at reaction temperatures of from 220 to 270° C., preferably from 230 to 250° C., and at superatmospheric pressure or atmospheric pressure, as a function of the system used. Using residence times of from 2 to 30 minutes, preferably from 4 to 15 minutes, it is possible to prepare polyester mixtures whose intrinsic viscosity is from 160 to 320 cm$^3$/g to DIN 53728 and whose acid numbers to DIN EN 12634 are preferably from 0.5 to 1.2 mg KOH/g and particularly preferably from 0.6 to 1.0 mg KOH/g.

As a function of the type of polylactic acid used, and the content of polylactic acid, in the mixture, the MVR (melt volume rate) to EN ISO 1133 (190° C., 2.16 kg weight) after stage v is generally from 0.5 to 6.0 cm$^3$/10 min, preferably from 1.0 to 5.0 cm$^3$/10 min, and particularly preferably from 1.5 to 3 cm$^3$/10 min.

While the compounds b2 act as described above in particular as crosslinking agents, the isocyanates act at low temperatures in particular as linear chain extenders. If the chain extension reaction (stage iv) is carried out at relatively high temperatures, in particular at temperatures above 120° C., allophanate formation occurs. The chain extender then also acts as branching agent and has direct influence on the pseudoplasticity of the biodegradable polyesters. The rheology of the melts improves; the biodegradable polyesters are easier to process, for example giving better results when drawn by melt-solidification processes to give foils. The isocyanates d1 have shear-thinning effect, and this means that viscosity decreases under load.

The reactor in which the chain reaction is carried out has the internals described above, these providing good mixing of the product stream.

Because of the marked viscosity increase during the chain extension reaction, it can be advantageous to run the chain extension reaction in the reactor only until the chain extender has reacted fully at least with one functional unit. The chain length increase can be completed by way of example in a separate stirred vessel or in a tube without internals. This method can avoid blockages and wall deposits.

The fully reacted melt is generally transferred directly by way of a melt filter to the finishing process, for example underwater pelletization.

The preferably five-stage process of the invention can produce viscous polyester mixtures with low MVR that have excellent suitability for foam applications or film applications. In particular, polyester mixtures are produced that have good processing properties for thin films free from fish-eyes.

Test Methods:

The acid number was determined to DIN EN 12634 of October 1998. The solvent mixture used comprised a mixture of 1 part by volume of DMSO, 8 parts by volume of propan-2-ol, and 7 parts by volume of toluene. The specimen was heated to 50° C., and the circuit used a combination electrode with potassium chloride filling. The standard solution used was tetramethylammonium hydroxide.

Intrinsic viscosity was determined to DIN 53728, part 3, Jan. 3, 1985. The solvent used comprised the following mixture: phenol/dichlorobenzene, 50/50 ratio by weight.

Melt volume flow rate (MVR) was determined to ISO 1133. The test conditions were 190° C., 2.16 kg. The melting time was 4 minutes. The MVR gives the rate of extrusion of a molten plastics molding composition through an extrusion die of defined length and defined diameter under the prescribed conditions: temperature, load, and position of piston. The volume in the barrel of an extrusion plastometer extruded in a defined time is determined.

EXAMPLES

1. Continuous Preparation of Polybutylene Adipate-Co-Terephthalate/Polylactic Acid Mixture Chain-Extended Using HDI To prepare the biodegradable polyester, 440 kg/h of dimethyl terephthalate, 510 kg/h of a prepolyester composed of adipic acid and 1,4-butanediol (Mn 2000 g/mol), 270 kg/h of 1,4-butanediol, and 1.0 kg/h of glycerol were added continuously with 0.55 kg/h of tetrabutyl orthotitanate to a multistage stirred-tank cascade. The reaction mixture was transesterified at atmospheric pressure within the stirred-tank cascade at temperatures of from 180° C. to 210° C. and with a residence time of 2.5 h, and the resulting condensation product methanol was removed by distillation. The intrinsic viscosity (IV) of the resultant low-molecular-weight polyester was 10 cm$^3$/g.

The reaction mixture was then heated to 260° C. in a downstream riser-tube reactor, in which the melt is passed (see DE 19509551) through a large number of heated tubes with addition of 0.30 kg/h of tetrabutyl orthotitanate, the pressure is lowered to 100 mbar, and most of the excess butanediol is removed by distillation. After a residence time of 45 minutes, the IV of the polyester was 23 cm$^3$/g.

After addition of 0.28 kg/h of phosphorous acid, the reaction mixture was transferred to a rotating-disk reactor (cf. U.S. Pat. No. 5,779,986) and polycondensed at a temperature of 250° C. and at a pressure of 4 mbar for a further 45 minutes, and the remaining excess of butanediol was removed by distillation. The IV of the resultant polyester was 89 cm$^3$/g and its acid number (AN) was 1.0 mg KOH/g.

In stage iv, the hot melt stream of the polyester (68% by weight) was mixed in a static mixer with a hot melt stream of polylactic acid (32% by weight of NatureWorks 3251 D) which had been previously melted by an extruder.

Following the polycondensation process, 8.0 kg/h of hexamethylene diisocyanate (HDI) were metered into the polyester at 240° C., using a static mixer system. After a residence time of 7 minutes, the polyester was pelletized by an underwater pelletizer and dried. The IV of the resultant polyester was 185 cm$^3$/g, its molar mass Mn was 32 000 g/mol (its Mw being 135 000 g/mol), its MVR was 5 cm$^3$/10 min, and its AN was 1.1 mg KOH/g. The melt was pelletized without difficulty and then processed to give chill-roll or blown foils free from fish-eyes.

2. Continuous Production of Polybutylene Adipate-Co-Terephthalate/Polylactic Acid Mixture Chain-Extended Using HDI To prepare the biodegradable polyester, 19 kg/h of terephthalic acid, 19 kg/h of adipic acid, 32 kg/h of 1,4-butanediol, and 0.05 kg/h of glycerol were mixed physically at 35° C., and then the mixture was continuously transferred to an esterification vessel (e.g. designed in the form of a hydrocyclone as described by way of example in WO 03/042278 A1). The mixture was esterified at a temperature of 240° C., with a residence time of 1.5 h, and at a pressure of 0.85 bar, with addition of a further 16 kg/h of 1,4-butanediol and 0.022 kg/h of tetrabutyl orthotitanate (TBOT), and the resulting condensation product water was removed by distillation, as also was some of the excess of butanediol. The intrinsic viscosity (IV) of the resultant low-molecular-weight polyester was 12 cm$^3$/g.

The reaction mixture, with addition of a further 0.012 kg of TBOT/h, was then passed through a downflow cascade (as described by way of example in WO 03/042278 A1) at a temperature rising from 250 to 260° C., with a residence time of 2 h, and at a pressure falling from 300 mbar to 10 mbar, and most of the excess butanediol was removed by distillation. The intrinsic viscosity (IV) of the resultant polyester was 47 cm$^3$/g.

After addition of 0.01 kg/h of phosphorous acid, the reaction mixture was transferred to a polycondensation reactor (as described by way of example in EP 0719582), and polycondensed at a temperature of 245° C. and at a pressure of 1 mbar for a further 45 minutes, and the remaining excess of butanediol was removed by distillation. The IV of the resultant polyester was 95 cm$^3$/g and its acid number (AN) was 0.6 mg KOH/g. In stage iv, the hot melt stream of the polyester (55% by weight) was mixed in a static mixer with a hot melt stream of polylactic acid (45% by weight of NatureWorks 4042 D) which had been previously melted by an extruder.

Following the polycondensation process, 0.4 kg/h of hexamethylene diisocyanate (HDI) were metered into the polyester at 240° C., using a static mixer system. After a residence time of 7 minutes, the polyester was pelletized by an underwater pelletizer and dried. The IV of the resultant polyester was 280 cm$^3$/g, its molar mass Mn was 45 000 g/mol (its Mw being 180 000 g/mol), its MVR was 2.5 cm$^3$/10 min, and its AN was 0.8 mg KOH/g. Here again, the polyester mixture was pelletized and processed on a chill-roll plant to give thin films (20 μm) with no fish-eyes.

The invention claimed is:

1. A process for the continuous production of polyester mixtures comprising:
    a) from 10 to 80% by weight of a biodegradable polyester (Q) composed of aliphatic or aliphatic and aromatic dicarboxylic acids and of aliphatic dihydroxy compounds, and
    b) from 20 to 90% by weight of one or more polymers (T) selected from the group consisting of: polylactic acid, polycaprolactone, polypropylene carbonate, polyglycolide, aliphatic polyester, cellulose acetate, and polyhydroxyalkanoate, the process comprising i) mixing the aliphatic dihydroxy compounds, the aliphatic and aromatic dicarboxylic acids and, if appropriate, further comonomers (component C) to form a mixture, without addition of any catalyst, to give a paste or, as an alternative, the liquid esters of the dicarboxylic acids are fed into the system, as also are the dihydroxy compound and, optionally, further comonomers, without addition of any catalyst, and in a first stage this mixture, together with the entire amount or with a portion of the catalyst, is continuously esterified or transesterified to obtain an esterification or transesterification product;

ii) in a second stage, the transesterification product or esterification product obtained in i) is continuously precondensed to an intrinsic viscosity of from 20 to 70 cm$^3$/g to DIN 53728;

iii) in a third stage, the product obtained from ii) is continuously polycondensed as far as an intrinsic viscosity of from 60 to 170 cm$^3$/g to DIN 53728, and iv) in a fourth stage, the product obtained from iii) is continuously mixed with the polymer T, and v) optionally, in a fifth stage, the polymer mixture obtained from iv) is continuously reacted in a polyaddition reaction with a chain extender D as far as an intrinsic viscosity of from 150 to 320 cm$^3$/g to DIN 53728.

2. The process according to claim 1, where the biodegradable polyester Q is composed of:

A) an acid component composed of:
  a1) from 30 to 99 mol % of at least one aliphatic dicarboxylic acid or its esters, or a mixture thereof,
  a2) from 1 to 70 mol % of at least one aromatic dicarboxylic acid or its esters, or a mixture thereof, and
  a3) from 0 to 5 mol % of a compound comprising sulfonate groups,
  where the total of the molar percentages of components a1) to a3) does not exceed 100%, and B) a diol component composed of:
  b1) at least equimolar amounts with respect to component A of a $C_2$-$C_{12}$ alkanediol, or a mixture thereof, and
  b2) from 0 to 2% by weight, based on components A and b1), of a compound comprising at least 3 functional groups;

and, optionally, one or more components selected from

C) a component selected from:
  c1) at least one dihydroxy compound comprising ether functions and having the formula I HO—[(CH$_2$)$_n$—O]$_m$—H    (I)

where n is 2, 3 or 4 and m is a whole number from 2 to 250, c2) at least one hydroxycarboxylic acid of the formula IIa or IIb

where p is a whole number from 1 to 1500 and r is a whole number from 1 to 4, and G is a radical selected from the group consisting of phenylene, —(CH$_2$)$_q$—, where q is a whole number from 1 to 5, —C(R)H— and —C(R)HCH$_2$, where R is methyl or ethyl, c3) at least one amino-$C_2$-$C_{12}$ alkanol, or at least one amino-$C_5$-$C_{10}$ cycloalkanol, or a mixture of these, c4) at least one diamino-$C_1$-$C_8$ alkane, c5) at least one aminocarboxylic acid compound, selected from the group consisting of caprolactam, 1,6-aminocaproic acid, laurolactam, 1,12-aminolauric acid, and 1,11-aminoundecanoic acid, or a mixture composed of c1) to c5), and D) from 0.01 to 4% by weight, based on the polymer mixture in or after stage iv, of at least one component selected from the group d1) to d4)
  d1) of a di- or oligofunctional isocyanate and/or isocyanurate,
  d2) of a di- or oligofunctional peroxide,
  d3) of a di- or oligofunctional epoxide,
  d4) of a di- or oligofunctional oxazoline, oxazine, caprolactam, or carbodiimide;

E) from 0 to 10% by weight, based on the amount of polyester after stage iii, of a component selected from the group e1) to e2)
  e1) of a lubricant, such as erucamide or a stearate,
  e2) of a nucleating agent, such as talc, boron nitride, PLLA-PDLA stereocomplex, calcium carbonate, polyethylene terephthalate, or polybutylene terephthalate.

3. The process according to claim 1, where the biodegradable polyester Q comprises, as aliphatic dicarboxylic acid (component a1)), succinic acid, adipic acid, or sebacic acid, ester thereof, or a mixture thereof;
  as aromatic dicarboxylic acid (component a2)), terephthalic acid or ester thereof;
  as diol component (component B), 1,4-butanediol or 1,3-propanediol,
  as component b2), glycerol, pentaerythritol, trimethylolpropane, and
  as component d1), hexamethylene diisocyanate.

4. The process according to claim 1, wherein the esterification/transesterification process (stage i)) uses a hydrocyclone with attached heat exchanger, and stage i), ii), and iii) is carried out in the presence of a titanium catalyst.

5. The process according to claim 1, wherein stage ii) is carried out in a tower reactor, and the product stream is conducted cocurrently through a falling-film cascade, and the reaction vapors are removed in situ from the reaction mixture.

6. The process according to claim 5, wherein, in stage ii), the transesterification product or esterification product is precondensed as far as an intrinsic viscosity of from 25 to 55 cm3/g to DIN 53728.

7. The process according to claim 1, wherein, between stage ii) and iii), from 0.001 to 0.1% by weight of a deactivating phosphorus compound or from 0.001 to 1.5% by weight of a color-stabilizing or activating phosphorus compound is added to the product stream.

8. The process according to claim 1, wherein at the start of, during, or at the end of stage iii, in stage iv, or in a previous step of chain extension, from 0.01 to 2.0% by weight, based on the respective polymer composition, of an acid scavenger selected from the group consisting of di- or oligofunctional epoxide (d3), oxazoline, oxazine, caprolactam, carbodiimide (d4), and combinations thereof is added.

9. The process according to claim 1, wherein stage iii) is carried out in a rotating-disk reactor or cage reactor.

10. The process according to claim 1, wherein, in stage iv), from 0.05 to 2.0% by weight of a lubricant e1 is added, based on the polymer composition after stage iii.

11. The process according to claim 1, wherein, in stage iv), from 0.05 to 5.0% by weight of a nucleating agent e2 is added, based on the polymer composition after stage iii.

12. The process according to claim 1, wherein, in stage iv), polymer T is fed in the form of masterbatch—comprising one or more additives.

13. The process according to claim 12, wherein the one or more additives are selected from the group consisting of lubricants (e1), nucleating agents (e2), compatibilizers/chain extenders (d3), acid scavengers (d4), and combinations thereof.

14. The process according to claim 1 for the production of polymer mixtures comprising from 40 to 75% by weight of polyester Q and from 25 to 60% by weight of polymer T.

15. The process according to claim 1 for the production of polyester mixtures comprising from 40 to 75% by weight of polyester Q and from 25 to 60% by weight of polylactic acid.

16. The process according to claim 1, wherein stage iv and, if appropriate, v) are carried out in an extruder, List reactor, or static mixer.

17. The process according to claim 1, where, in stage v), hexamethylene diisocyanate (component d1) is used as chain extender.

* * * * *